United States Patent
Kobayashi et al.

(10) Patent No.: US 9,180,877 B2
(45) Date of Patent: Nov. 10, 2015

(54) CONTROL DEVICE

(75) Inventors: Yasuhiko Kobayashi, Anjo (JP); Yuma Mori, Kota (JP); Yomei Hakumura, Susono (JP)

(73) Assignee: AISIN AW CO., LTD., Anjo (JP)

( * ) Notice: Subject to any disclaimer, the term of this patent is extended or adjusted under 35 U.S.C. 154(b) by 68 days.

(21) Appl. No.: 14/235,911

(22) PCT Filed: Aug. 21, 2012

(86) PCT No.: PCT/JP2012/071081
§ 371 (c)(1),
(2), (4) Date: Jan. 29, 2014

(87) PCT Pub. No.: WO2013/027726
PCT Pub. Date: Feb. 28, 2013

(65) Prior Publication Data
US 2014/0162841 A1 Jun. 12, 2014

(30) Foreign Application Priority Data

Aug. 24, 2011 (JP) ................................. 2011-182973

(51) Int. Cl.
| | |
|---|---|
| *B60K 6/48* | (2007.10) |
| *B60W 10/02* | (2006.01) |
| *B60W 10/08* | (2006.01) |
| *B60W 20/00* | (2006.01) |
| *B60L 11/14* | (2006.01) |
| *B60L 7/18* | (2006.01) |
| *B60L 3/00* | (2006.01) |
| *B60L 15/20* | (2006.01) |
| *B60K 6/547* | (2007.10) |

(52) U.S. Cl.
CPC .................. *B60W 20/40* (2013.01); *B60K 6/48* (2013.01); *B60K 6/547* (2013.01); *B60L 3/0023* (2013.01); *B60L 7/18* (2013.01); *B60L 11/14* (2013.01); *B60L 15/2054* (2013.01); *B60W 10/02* (2013.01); *B60W 10/08* (2013.01); *B60W 20/00* (2013.01); *B60K 2006/4825* (2013.01); (Continued)

(58) Field of Classification Search
CPC ........ B60K 6/48; B60W 10/02; B60W 10/08; B60W 20/00
See application file for complete search history.

(56) References Cited

U.S. PATENT DOCUMENTS

| | | | |
|---|---|---|---|
| 8,668,621 B2 * | 3/2014 | Yoshida et al. | 477/5 |
| 8,712,613 B2 * | 4/2014 | Yoshida et al. | 701/22 |

(Continued)

FOREIGN PATENT DOCUMENTS

| | | |
|---|---|---|
| JP | A-2008-7094 | 1/2008 |
| JP | 2008-074254 A | 4/2008 |

(Continued)

OTHER PUBLICATIONS

International Search Report issued in International Patent Application No. PCT/JP2012/071081 dated Sep. 18, 2012.

(Continued)

*Primary Examiner* — Tisha Lewis
(74) *Attorney, Agent, or Firm* — Oliff PLC

(57) ABSTRACT

A control device controls a vehicle drive device in which a first engagement device, a rotary electric machine, a second engagement device, and an output member are arranged on a power transfer path from an internal combustion engine to wheels. The control device executes mode transition control that causes transition from (i) a first control mode in which both the first engagement device and the second engagement device are in a slip engagement state and the rotary electric machine generates electric power to (ii) a second control mode in which the first engagement device is in a direct engagement state, the second engagement device is in the slip engagement state, and the rotary electric machine generates electric power.

13 Claims, 7 Drawing Sheets

(52) U.S. Cl.
CPC ........ *B60L2240/36* (2013.01); *B60L 2240/421* (2013.01); *B60L 2240/427* (2013.01); *B60L 2240/443* (2013.01); *B60L 2240/507* (2013.01); *B60L 2270/145* (2013.01); *B60W 2710/027* (2013.01); *B60Y 2300/429* (2013.01); *Y02T 10/6221* (2013.01); *Y02T 10/6252* (2013.01); *Y02T 10/642* (2013.01); *Y02T 10/70* (2013.01); *Y02T 10/7077* (2013.01); *Y02T 10/7275* (2013.01); *Y10S 903/902* (2013.01); *Y10T 477/26* (2015.01)

(56) References Cited

U.S. PATENT DOCUMENTS

| | | | | |
|---|---|---|---|---|
| 8,992,377 | B2 * | 3/2015 | Kobayashi | 477/5 |
| 2007/0227790 | A1 * | 10/2007 | Tanishima | 180/65.2 |
| 2007/0272456 | A1 | 11/2007 | Shiiba | |
| 2007/0275819 | A1 | 11/2007 | Hirata | |
| 2007/0275823 | A1 * | 11/2007 | Motosugi et al. | 477/176 |
| 2009/0143189 | A1 | 6/2009 | Hasegawa et al. | |
| 2010/0248893 | A1 | 9/2010 | Shimanaka | |

FOREIGN PATENT DOCUMENTS

| | | |
|---|---|---|
| JP | 2009-214640 A | 9/2009 |
| JP | 2010-149649 A | 7/2010 |
| JP | 2010-188807 A | 9/2010 |
| JP | A-2010-190267 | 9/2010 |
| JP | A-2011-31659 | 2/2011 |

OTHER PUBLICATIONS

U.S. Appl. No. 14/119,792, filed Nov. 22, 2013.
Sep. 18, 2012 International Search Report issued in International Application No. PCT/JP2012/070251.
Oct. 2, 2014 Office Action issued in U.S. Appl. No. 14/119,792.
May 11, 2015 Office Action issued in U.S. Appl. No. 14/119,792.

* cited by examiner

FIG. 2

| TRAVEL MODE | | STARTING CLUTCH | FIRST CLUTCH | ROTARY ELECTRIC MACHINE |
|---|---|---|---|---|
| ELECTRIC TRAVEL MODE | | × | ○ | POWER RUNNING |
| PARALLEL TRAVEL MODE | PARALLEL ASSIST MODE | ○ | ○ | POWER RUNNING |
| | PARALLEL POWER GENERATION MODE | ○ | ○ | POWER GENERATION |
| SLIP TRAVEL MODE | SLIP ASSIST MODE | △ | △ | POWER RUNNING |
| | FIRST SLIP POWER GENERATION MODE | △ | △ | POWER GENERATION |
| | SECOND SLIP POWER GENERATION MODE | ○ | △ | POWER GENERATION |
| STATIONARY-STATE POWER GENERATION MODE | | ○ | × | POWER GENERATION |

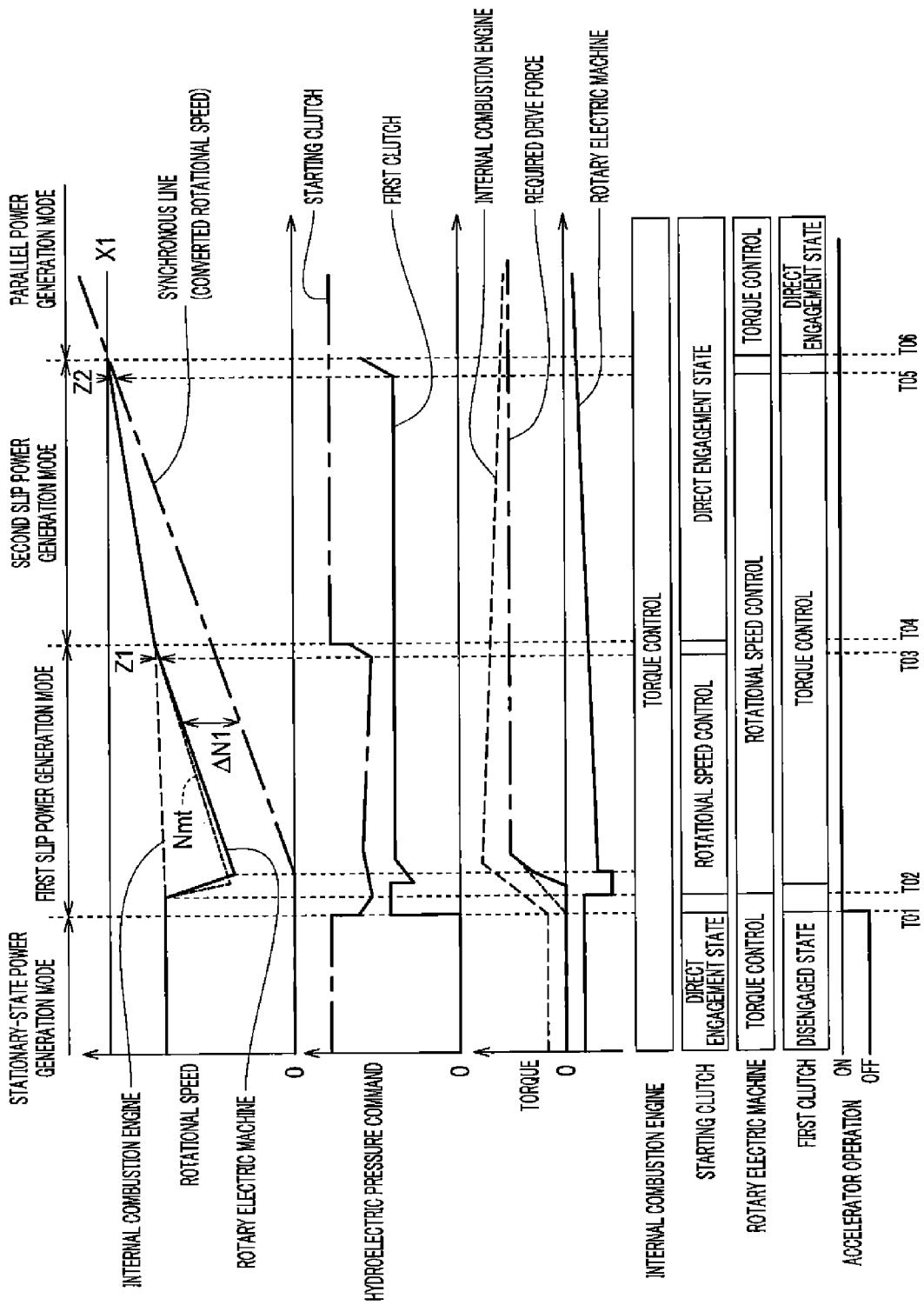

CONTROL DEVICE

TECHNICAL FIELD

The present invention relates to control devices that control a vehicle drive device in which a first engagement device, a rotary electric machine, a second engagement device, and an output member are sequentially arranged in this order from an internal combustion engine side on a power transfer path that connects the internal combustion engine to wheels.

BACKGROUND ART

A device described in Japanese Patent Application Publication No. 2008-7094 (JP 2008-7094 A, Patent Document 1) is already known as an example of the control device that controls a vehicle drive device described above. Hereinafter, in the description in the "BACKGROUND ART" section, member names used in Patent Document 1 are cited in brackets for description. The control device [controllers 1, 2, 5, 7, 10, etc.] of Patent Document 1 is configured to be able to execute a plurality of travel modes by controlling the vehicle drive device. The plurality of travel modes include a WSC creep mode, a CL2 overheat mode, and a WSC active power generation mode.

In the WSC creep mode, the control device brings the first engagement device [first clutch CL1] into a direct engagement state and the second engagement device [second clutch CL2] into a slip engagement state, and a vehicle creeps with the torque of the internal combustion engine [engine E]. In the CL2 overheat mode, the control device controls both the first engagement device and the second engagement device into the slip engagement state, and the vehicle creeps with the torque of the internal combustion engine. In the WSC active power generation mode, the control device brings the first engagement device into the direct engagement state and the second engagement device into the slip engagement state, and the vehicle travels and the rotary electric machine [motor-generator MG] generates electric power with the torque of the internal combustion engine. The control device is able to execute mode transition between the WSC creep mode and the CL2 overheat mode and between the WSC creep mode and the WSC active power generation mode (refer to FIG. 6 of Patent Document 1, etc.).

The control device of Patent Document 1, during low-speed traveling in a state in which the amount of electric power stored in an electricity storage device [battery 4] is low, achieves the WSC active power generation mode in order to allow the rotary electric machine to generate electric power. However, in the WSC active power generation mode, only the second engagement device is in the slip engagement state; therefore, a state in which a differential rotational speed between engagement members on both sides of the second engagement device is large continues for a long period. This increases the amount of heat generation of the second engagement device, which may cause the second engagement device to get overheated. That is, it has been difficult to secure a desired amount of electric power while keeping the amount of heat generation of the second engagement device low in a specific traveling state such as low vehicle speed traveling.

On the other hand, in a state in which the vehicle speed has increased to a certain extent, the differential rotational speed between the engagement members on both sides of the second engagement device becomes comparatively small and the possibility of the second engagement device getting overheated becomes relatively low. Therefore, there are cases in which it is preferable to give priority to achieving other effects regarding vehicle traveling such as overall amount of heat generation of both of the engagement devices and the power generation efficiency of the rotary electric machine, or reducing shock to be transferred to the vehicle, etc. rather than only suppressing overheat in the second engagement device. In Patent Document 1, such matters are not particularly recognized.

RELATED-ART DOCUMENTS

Patent Documents

Patent Document 1: Japanese Patent Application Publication No. 2008-7094 (JP 2008-7094 A)

SUMMARY OF THE INVENTION

Problem to be Solved by the Invention

It is therefore desired to implement a control device capable of securing a desired amount of electric power while suppressing the amount of heat generation of a second engagement device and establishing a desired traveling state according to the situation, in a specific traveling state such as low vehicle speed traveling, etc.

Means for Solving the Problem

The present invention provides a control device that controls a vehicle drive device in which a first engagement device, a rotary electric machine, a second engagement device, and an output member are sequentially arranged in this order from an internal combustion engine side on a power transfer path that connects the internal combustion engine to wheels, characterized in that: the control device executes mode transition control in which a first control mode where the rotary electric machine generates electric power with both the first engagement device and the second engagement device in a slip engagement state is transitioned to a second control mode where the rotary electric machine generates electric power with the first engagement device in a direct engagement state and the second engagement device in the slip engagement state.

The term "rotary electric machine" refers to any of a motor (electric motor), a generator (electric generator), and a motor generator that functions both as a motor and as a generator as necessary.

The term "direct engagement state" means a state in which engagement members on both sides of a subject engagement device are engaged with each other so as to rotate together with each other. The term "slip engagement state" means a state in which the engagement members on both sides of the subject engagement device are engaged with each other with a differential rotational speed between the engagement members, so that a drive force can be transferred. The term "disengaged state" means a state in which no rotation or drive force is transferred between the engagement members on both sides of the subject engagement device.

According to the characteristic configuration described above, in the first control mode, both the first engagement device and the second engagement device are brought into the slip engagement state. This enables to decrease the differential rotational speed between the engagement members on both sides of the second engagement device, for example, in a state in which a vehicle travels at a low vehicle speed while the internal combustion engine is driven at a rotational speed at which the internal combustion engine can continue self-sustained operation, for example, compared to a case where the first engagement device is brought into the direct engagement state and the second engagement device brought into the slip engagement state, as in the second control mode. Thereby, the amount of heat generation of the engagement members of the second engagement device can be suppressed. In addition, by bringing the second engagement device into the slip engagement state, the rotational speed of the rotary electric machine can be maintained greater than the rotational speed according to the rotational speed of the output member. Thus, a desired power generation amount can be ensured by causing the rotary electric machine rotating at such rotational speed to generate electric power.

In addition, according to the characteristic configuration described above, the second engagement device is brought into the slip engagement state also in the second control mode. This makes it possible to maintain the rotational speed of the rotary electric machine greater than the rotational speed according to the rotational speed of the output member, and ensure the desired power generation amount. In this event, the first engagement device is brought into the direct engagement state instead of the slip engagement state. This makes it possible to transfer the torque of the internal combustion engine to the side of the rotary electric machine with smaller loss and improve the power generation efficiency of the rotary electric machine. In addition, for example, compared to a case where both the first engagement device and the second engagement device are brought into the slip engagement state, as in the first control mode, it is possible to reduce the overall amount of heat generation of both the engagement devices by making the differential rotational speed between the engagement members on both sides of the first engagement device whose transfer torque is relatively large to zero. With the execution of the mode transition control, the mode transition from the first control mode to the second control mode can be appropriately performed according to the situation. At the time of the execution of the mode transition control, the first engagement device is transitioned from the slip engagement state to the direct engagement state. The state transition of the first engagement device is performed with the second engagement device in the slip engagement state. Therefore, it is possible to suppress the shock to be transferred to the vehicle in the state transition.

In addition, it is preferable that, in the first control mode, the control device: controls transfer torque of the second engagement device in the slip engagement state such that torque according to a required drive force to drive the wheels is transferred; and controls a rotational speed of the rotary electric machine so as to achieve a rotational speed that is obtained by adding a first differential rotational speed to a converted rotational speed that is obtained by converting a rotational speed of the output member to a rotational speed to be transferred to the rotary electric machine in the case where it is assumed that the second engagement device is in the direct engagement state.

According to the configuration, it is possible to transfer the torque according to the required drive force to the output member side through the second engagement device that is brought into the slip engagement state in the first control mode. Thus, the required drive force can be appropriately fulfilled.

In addition, by controlling the rotational speed of the rotary electric machine so as to achieve a rotational speed that is greater than the converted rotational speed according to the rotational speed of the output member by the first differential rotational speed, the slip engagement state can be appropriately established in the second engagement device.

Alternatively, it is preferable that, in the first control mode, the control device: controls transfer torque of the second engagement device in the slip engagement state such that torque according to a required drive force to drive the wheels is transferred; and controls a rotational speed of the rotary electric machine so as to achieve a set rotational speed that is previously set, and when a differential rotational speed between the set rotational speed and a converted rotational speed that is obtained by converting a rotational speed of the output member to a rotational speed to be transferred to the rotary electric machine in the case where it is assumed that the second engagement device is in the direct engagement state becomes equal to or smaller than a second differential rotational speed, controls the rotational speed of the rotary electric machine so as to achieve a rotational speed that is obtained by adding the second differential rotational speed to the converted rotational speed.

According to the configuration, it is possible to transfer the torque according to the required drive force to the output member side through the second engagement device that is brought into the slip engagement state in the first control mode. Thus, the required drive force can be appropriately fulfilled.

In addition, the slip engagement state can be appropriately established in the second engagement device by controlling the rotational speed of the rotary electric machine so as to achieve the set rotational speed that is previously set or the rotational speed that is greater than the converted rotational speed according to the rotational speed of the output member by the second differential rotational speed, whichever is greater. In addition, according to the configuration, the rotational speed of the rotary electric machine can be maintained equal to or greater than the set rotational speed. Thus, by appropriately setting the set rotational speed, the rotational speed of the rotary electric machine can be maintained equal to or greater than a predetermined rotational speed that is necessary according to various kinds of targets.

In addition, it is preferable that, in the first control mode, when a temperature of the second engagement device becomes equal to or higher than a high temperature determination threshold that is previously determined, the control device controls a rotational speed of the rotary electric machine such that a differential rotational speed between a converted rotational speed that is obtained by converting a rotational speed of the output member to a rotational speed to be transferred to the rotary electric machine in the case where it is assumed that the second engagement device is in the direct engagement state and the rotational speed of the rotary electric machine is decreased.

According to the configuration, it can be sensed based on the magnitude relation between the temperature of the second engagement device and the high temperature determination threshold that the second engagement device is about to be overheated. When such situation is sensed, the differential rotational speed of the engagement members on both sides of the second engagement device can be decreased and the amount of heat generation of the second engagement device can be reduced. Thus, it can be suppressed that the temperature of the second engagement device further increases after exceeding the high temperature determination threshold, and the overheating of the second engagement device can be suppressed.

In addition, it is preferable that the differential rotational speed is decreased as the temperature of the second engagement device increases after exceeding the high temperature determination threshold.

According to the configuration, an increase in the temperature of the second engagement device can be more efficiently suppressed as an excess amount of the temperature of the second engagement device with respect to the high temperature determination threshold increases. In addition, in this configuration, in the case where the excess amount in the temperature of the second engagement device with respect to the high temperature determination threshold is relatively small, the amount of decrease in the differential rotational speed is reduced according to the excess amount. Thereafter, the differential rotational speed between the engagement members on both sides of the second engagement device is increased to the extent that overheating of the second engagement device does not become especially crucial, which makes it possible to reduce the overall amount of heat generation of both the engagement devices.

In addition, it is preferable that, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

According to the configuration, with the execution of the mode transition control, along with an increase in the rotational speed of the output member, the mode transition can be appropriately performed from the first control mode to the second control mode. In addition, along with a further increase in the rotational speed of the output member, the mode transition can be performed from the second control mode to a third control mode. In the third control mode, the vehicle can be driven while the heat generation of both the engagement devices is suppressed and the rotary electric machine generates electric power with high efficiency.

BRIEF DESCRIPTION OF THE DRAWINGS

FIG. 2 is a table showing travel modes that can be implemented by the control device.

FIG. 3 is a timing chart showing an example of the operating state of each part at the time power generation starting control is performed.

MODES FOR CARRYING OUT THE INVENTION

Figure 1:
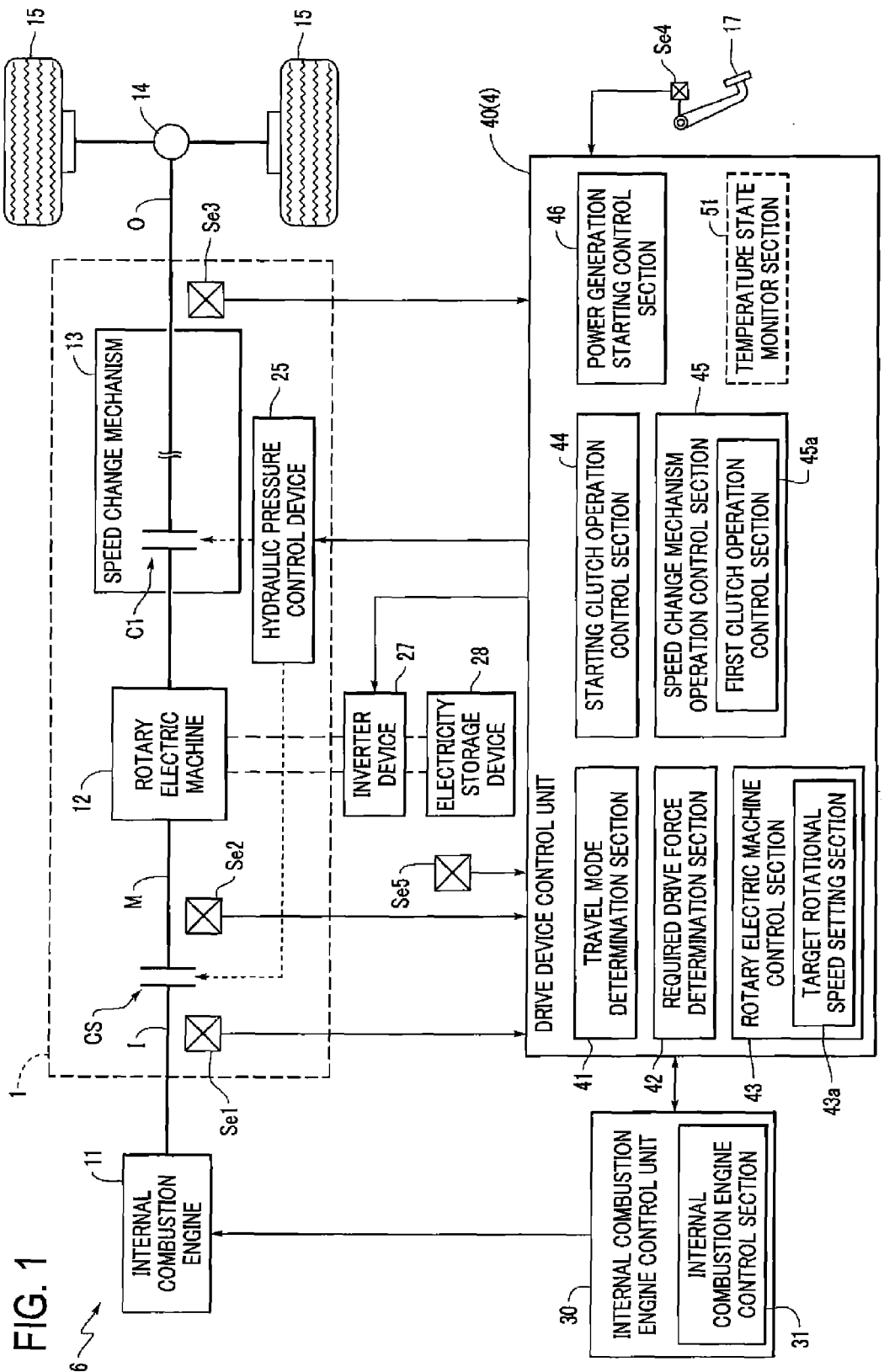
FIG. 1 is a schematic diagram showing a schematic configuration of a vehicle drive device and a control device for the vehicle drive device according to an embodiment.

A control device according to an embodiment of the present invention will be described with reference to the drawings. As shown in FIG. 1, a control device 4 according to the embodiment is a drive device control unit that controls a drive device 1. The drive device drives a vehicle (hybrid vehicle) 6 that includes both an internal combustion engine 11 and a rotary electric machine 12. The drive device 1 and the control device 4 according to the embodiment will be described in detail below.

In the following description, the term "drivingly coupled" means a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed (for example, a shaft, a gear mechanism, a belt, and a chain, etc). Here, the term "drive force" is used as a synonym for "torque".

The term "engagement pressure" refers to a pressure at which an engagement member on one side of an engagement device and an engagement member on the other side of the engagement device are pressed against each other by, for example, a hydraulic servomechanism, etc. The term "disengagement pressure" refers to a pressure at which the engagement device is steadily brought into a disengaged state. The term "disengagement boundary pressure" refers to a pressure (disengagement-side slip boundary pressure) at which the engagement device is brought into a slip boundary state between the disengaged state and a slip engagement state. The term "engagement boundary pressure" refers to a pressure (engagement-side slip boundary pressure) at which the engagement device is brought into a slip boundary state between the slip engagement state and a direct engagement state. The term "complete engagement pressure" refers to a pressure at which the engagement device is steadily brought into the direct engagement state.

1. Configuration of Drive Device

The drive device 1 to be controlled by the control device 4 according to the present embodiment is configured as a drive device for so-called one-motor parallel type hybrid vehicles. As shown in FIG. 1, the drive device 1 includes a starting clutch CS, the rotary electric machine 12, a speed change mechanism 13, and an output shaft O in this order from the internal combustion engine 11 and an input shaft I side on a power transfer path that connects the input shaft I drivingly coupled to the internal combustion engine 11 to the output shaft O drivingly coupled to wheels 15. Note that the speed change mechanism 13 includes a first clutch C1 for shifting, as described below. Thus, the starting clutch CS, the rotary electric machine 12, the first clutch C1, and the output shaft O are sequentially arranged in this order from the input shaft I side on the power transfer path that connects the input shaft I to the output shaft O. These components are accommodated in a case (drive device case). In the present embodiment, the output shaft O corresponds to an "output member" in the present invention.

The internal combustion engine 11 is a motor driven by combusting fuel inside the engine to take out motive power. For example, a gasoline engine, a diesel engine, or the like is used as the internal combustion engine 11. The internal combustion engine 11 is drivingly coupled to the input shaft I so as to rotate therewith. In the present example, an output shaft, such as a crankshaft, of the internal combustion engine 11 is drivingly coupled to the input shaft I. The internal combustion engine 11 is drivingly coupled to the rotary electric machine 12 via the starting clutch CS.

The starting clutch CS is provided in a manner that allows releasing drivingly coupling between the internal combustion engine 11 and the rotary electric machine 12. The starting clutch CS is a friction engagement device that selectively drivingly couples the input shaft I to an intermediate shaft M and the output shaft O, and functions as a clutch for disconnection of the internal combustion engine. A wet multi-plate clutch, a dry single-plate clutch, or the like may be used as the starting clutch CS. In the present embodiment, the starting clutch CS corresponds to a "first engagement device" in the present invention.

The rotary electric machine 12 has a rotor and a stator (not shown), and is capable of performing a function as a motor (an electric motor) and a function as a generator (an electric generator). The rotor of the rotary electric machine 12 is drivingly coupled to the intermediate shaft M so as to rotate therewith. The rotary electric machine 12 is electrically connected to an electricity storage device 28 via an inverter device 27. A battery, a capacitor, or the like may be used as the electricity storage device 28. The rotary electric machine 12 is supplied with electric power from the electricity storage device 28 to perform power running, or supplies electric power generated by output torque of the internal combustion engine 11 or an inertial force of the vehicle 6 to the electricity storage device 28 to store the electric power therein. The intermediate shaft M is drivingly coupled to the speed change mechanism 13. That is, the intermediate shaft M, which is an output shaft (rotor output shaft) of the rotor of the rotary electric machine 12, serves as an input shaft (transmission input shaft) of the speed change mechanism 13.

The speed change mechanism 13 is an automatic stepped speed change mechanism that enables switching between a plurality of shift speeds with different speed ratios. In order to form the plurality of shift speeds, the speed change mechanism 13 includes a gear mechanism such as a planetary gear mechanism, and a plurality of engagement devices (friction engagement devices in the present example) such as clutches and brakes which engage or disengage rotating elements of the gear mechanism. A wet multi-plate clutch or the like may be used as the plurality of engagement devices. In the present embodiment, the plurality of engagement devices includes the first clutch C1, and also includes other clutches, brakes, or the like. In the present embodiment, the first clutch C1 corresponds to a "second engagement device" in the present invention.

The speed change mechanism 13 shifts the rotational speed of the intermediate shaft M and converts the torque thereof based on a predetermined speed ratio that is set for each shift speed formed according to the engagement state of the plurality of engagement devices for shifting, and transfers the resultant rotational speed and torque to the output shaft O serving as an output shaft (shift output shaft) of the speed change mechanism 13. The term "speed ratio" refers to a ratio of the rotational speed of the intermediate shaft M (shift input shaft) to the rotational speed of the output shaft O (shift output shaft). The torque transferred from the speed change mechanism 13 to the output shaft O is distributed and transferred to the two wheels 15 on the right and left sides via an output differential gear unit 14. This allows the drive device 1 to transfer torque of one or both of the internal combustion engine 11 and the rotary electric machine 12 to the wheels 15 to drive the vehicle 6.

In the present embodiment, the drive device 1 includes a mechanical oil pump (not shown) that is drivingly coupled to the intermediate shaft M. The oil pump is actuated by being driven by a drive force of one or both of the rotary electric machine 12 and the internal combustion engine 11 to generate a hydraulic pressure. The oil from the oil pump is regulated to a predetermined hydraulic pressure by a hydraulic pressure control device 25 to be supplied to the starting clutch CS, the first clutch C1, and the like. Note that the drive device 1 may include an electric oil pump separately from the mentioned oil pump.

As shown in FIG. 1, a plurality of sensors Se1 to Se5 are provided in various portions of the vehicle 6. The input shaft rotational speed sensor Se1 is a sensor that detects the rotational speed of the input shaft I. The rotational speed of the input shaft I detected by the input shaft rotational speed sensor Se1 is equal to the rotational speed of the internal combustion engine 11. The intermediate shaft rotational speed sensor Se2 is a sensor that detects the rotational speed of the intermediate shaft M. The rotational speed of the intermediate shaft M detected by the intermediate shaft rotational speed sensor Se2 is equal to the rotational speed of the rotor of the rotary electric machine 12. The output shaft rotational speed sensor Se3 is a sensor that detects the rotational speed of the output shaft O. The control device 4 can also derive the vehicle speed, at which the vehicle 6 is driven, on the basis of the rotational speed of the output shaft O detected by the output shaft rotational speed sensor Se3.

The accelerator operation amount detection sensor Se4 is a sensor that detects the amount of operation of an accelerator pedal 17 to detect the accelerator operation amount. The charge state detection sensor Se5 is a sensor that detects the state of charge (SOC). The control device 4 can also derive the amount of electric power stored in the electricity storage device 28 on the basis of the SOC detected by the charge state detection sensor Se5. Information indicating the detection results of the sensors Se1 to Se5 is output to the control device 4.

2. Configuration of Control Device

As shown in FIG. 1, the control device 4 according to the embodiment includes a drive device control unit 40. The drive device control unit 40 mainly controls the rotary electric machine 12, the starting clutch CS, and the speed change mechanism 13. Besides the drive device control unit 40, the vehicle 6 also includes an internal combustion engine control unit 30 that mainly controls the internal combustion engine 11.

The internal combustion engine control unit 30 and the drive device control unit 40 are configured to exchange information between each other. Various functional sections provided in the internal combustion engine control unit 30 and the drive device control unit 40 are also configured to exchange information between each other. The internal combustion engine control unit 30 and the drive device control unit 40 are also configured to acquire information indicating the detection results of the sensors Se1 to Se5.

The internal combustion engine control unit 30 includes an internal combustion engine control section 31. The internal combustion engine control section 31 is a functional section that controls operation of the internal combustion engine 11. The internal combustion engine control section 31 determines target torque and a target rotational speed as control targets for internal combustion engine torque Te and the rotational speed, and drives the internal combustion engine 11 in accordance with the determined control targets. In the present embodiment, the internal combustion engine control section 31 can switch control for the internal combustion engine 11 between torque control and rotational speed control in accordance with the traveling state of the vehicle 6. In the torque control, a command for the target torque is provided to the internal combustion engine 11 to make the internal combustion engine torque Te follow (achieve to coincide with) the target torque. In the rotational speed control, a command for the target rotational speed is provided to the internal combustion engine 11 to determine target torque such that the rotational speed of the internal combustion engine 11 follows the target rotational speed.

The drive device control unit 40 includes a travel mode determination section 41, a required drive force determination section 42, a rotary electric machine control section 43, a starting clutch operation control section 44, a speed change mechanism operation control section 45, and a power generation starting control section 46.

The travel mode determination section 41 is a functional section that determines a travel mode of the vehicle 6. The travel mode determination section 41 determines the travel mode to be established by the drive device 1 on the basis of, for example, the vehicle speed, the accelerator operation amount, the amount of electric power stored in the electricity storage device 28, and the like, for example, by referencing a predetermined map (mode selection map).

As shown in FIG. 2, in the present embodiment, examples of the travel mode that can be selected by the travel mode determination section 41 include an electric power travel mode, a parallel travel mode, a slip travel mode, and a stationary-state power generation mode. The parallel travel mode includes a parallel assist mode and a parallel power generation mode. The slip travel mode includes a slip assist mode, a first slip power generation mode, and a second slip power generation mode. Note that in FIG. 2, "○" in the column of each clutch CS, C1 means that each engagement device is brought into the direct engagement state, "Δ" means that each engagement device is brought into the slip engagement state, and "X" means that each engagement device is brought into the disengaged state. The "power running" in the column of the rotary electric machine 12 means that torque assist is performed on the vehicle 6, or that the vehicle 6 is merely idling.

As shown in FIG. 2, in the electric power travel mode, the starting clutch CS is brought into the disengaged state and the first clutch C1 is brought into the direct engagement state, and the rotary electric machine 12 performs power running. The control device 4 selects the electric power travel mode to drive the vehicle 6 with only the output torque (rotary electric machine torque Tm) of the rotary electric machine 12. In the parallel travel mode, both the starting clutch CS and the first clutch C1 are brought into the direct engagement state, and the rotary electric machine 12 performs power running or generates electric power. The control device 4 selects the parallel travel mode to drive the vehicle 6 with at least the internal combustion engine torque Te. In this event, the rotary electric machine 12 performs power running to assist the drive force with the internal combustion engine torque Te in the parallel assist mode, and generates electric power with the internal combustion engine torque Te in the parallel power generation mode.

In the slip assist mode, both the starting clutch CS and the first clutch C1 are brought into the slip engagement state, and the rotary electric machine 12 performs power running. The control device 4 selects the slip assist mode to drive the vehicle 6 with at least the internal combustion engine torque Te. In the first slip power generation mode, both the starting clutch CS and the first clutch C1 are brought into the slip engagement state, and the rotary electric machine 12 generates electric power. In the second slip power generation mode, the starting clutch CS is brought into the direct engagement state and the first clutch C1 is brought into the slip engagement state, and the rotary electric machine 12 generates electric power. The control device 4 selects either one of these two slip power generation modes to cause the rotary electric machine 12 to generate electric power and drive the vehicle 6 with the internal combustion engine torque Te. In the stationary-state power generation mode, the starting clutch CS is brought into the direct engagement state and the first clutch C1 is brought into the disengaged state, and the rotary electric machine 12 generates electric power. The control device 4 selects the stationary-state power generation mode to cause the rotary electric machine 12 to generate electric power with the internal combustion engine torque Te while the vehicle is stationary.

In the present embodiment, the first slip power generation mode corresponds to a "first control mode" in the present invention, and the second slip power generation mode corresponds to a "second control mode" in the present invention. In addition, the parallel power generation mode corresponds to a "third control mode" in the present invention. Further, only a part of travel modes including at least the first slip power generation mode, the second slip power generation mode, and the parallel power generation mode may be selectable. Alternatively, travel modes other than the aforementioned modes may be selectable.

The required drive force determination section 42 is a functional section that determines required drive force Td required to drive the wheels 15 so as to drive the vehicle 6. The required drive force determination section 42 determines the required drive force Td, for example, by referencing a predetermined map (required drive force determination map), on the basis of the vehicle speed and the accelerator operation amount. The determined required drive force Td is output to the internal combustion engine control section 31, the rotary electric machine control section 43, the power generation starting control section 46, and the like.

The rotary electric machine control section 43 is a functional section that controls operation of the rotary electric machine 12. The rotary electric machine control section 43 controls operation of the rotary electric machine 12 by determining target torque and a target rotational speed as control targets for the rotary electric machine torque Tm and the rotational speed and driving the rotary electric machine 12 in accordance with the determined control targets. In the present embodiment, the rotary electric machine control section 43 can switch control for the rotary electric machine 12 between torque control and rotational speed control in accordance with the traveling state of the vehicle 6. In the torque control, a command for the target torque is provided to the rotary electric machine 12 to make the rotary electric machine torque Tm follow the target torque. In the rotational speed control, a command for a target rotational speed Nmt is provided to the rotary electric machine 12 to determine target torque such that the rotational speed of the rotary electric machine 12 follows the target rotational speed Nmt. The rotary electric machine control section 43 is provided with a target rotational speed setting section 43a as a function section that sets such target rotational speed Nmt.

The starting clutch operation control section 44 is a functional section that controls operation of the starting clutch CS. The starting clutch operation control section 44 controls operation of the starting clutch CS by controlling the hydraulic pressure to be supplied to the starting clutch CS via the hydraulic pressure control device 25 to control the engagement pressure of the starting clutch CS. For example, the starting clutch operation control section 44 steadily brings the starting clutch CS into the disengaged state by outputting a hydraulic pressure command for the starting clutch CS and controlling the hydraulic pressure to be supplied to the starting clutch CS to the disengagement pressure in response to the hydraulic pressure command. The starting clutch operation control section 44 steadily brings the starting clutch CS into the direct engagement state by controlling the hydraulic pressure to be supplied to the starting clutch CS to the complete engagement pressure. In addition, the starting clutch operation control section 44 brings the starting clutch CS into the slip engagement state by controlling the hydraulic pressure to be supplied to the starting clutch CS to a slip engagement pressure that is equal to or greater than the disengagement boundary pressure and that is smaller than the engagement boundary pressure.

With the starting clutch CS in the slip engagement state, a drive force is transferred between the input shaft I and the intermediate shaft M with the input shaft I and the intermediate shaft M rotatable relative to each other. The magnitude of torque that can be transferred with the starting clutch CS in the direct engagement state or the slip engagement state is determined in accordance with the engagement pressure of the starting clutch CS at the time point. The magnitude of torque at this time is a "transfer torque capacity" of the starting clutch CS. In accordance with the transfer torque capacity, "transfer torque" of the starting clutch CS is defined. In the present embodiment, increase and decrease in engagement pressure and transfer torque capacity can be continuously controlled by continuously controlling the magnitudes of the amount of oil and the hydraulic pressure to be supplied to the starting clutch CS in response to the hydraulic pressure command for the starting clutch CS through a proportional solenoid or the like. The direction of torque transferred via the starting clutch CS in the slip engagement state is determined in accordance with the direction of relative rotation between the input shaft I and the intermediate shaft M.

In addition, the starting clutch operation control section 44 can switch control for the starting clutch CS between the torque control and the rotational speed control in accordance with the traveling state of the vehicle 6. In the torque control, a command for a target transfer torque capacity is provided to the starting clutch CS, and the transfer torque (transfer torque capacity) of the starting clutch CS is caused to follow the target transfer torque capacity. In the rotational speed control, the hydraulic pressure command for the starting clutch CS is provided or the target transfer torque capacity for the starting clutch CS is determined such that a differential rotational speed between the rotational speed of a rotary member (in the present example, the intermediate shaft M) coupled to one engagement member of the starting clutch CS and the rotational speed of a rotary member (in the present example, the input shaft I) coupled to the other engagement member follows a predetermined target differential rotational speed. In the rotational speed control for the starting clutch CS, when the rotational speed of the intermediate shaft M is defined, the rotational speed of the input shaft I is also defined by coinciding the differential rotational speed with the target differential rotational speed. Therefore, in the rotational speed control of the starting clutch CS, in other words, a command for the target rotational speed of the input shaft I is provided, and the hydraulic pressure command to the starting clutch CS is provided or the target transfer torque capacity for the starting clutch CS is determined such that the rotational speed of the input shaft I follows the target rotational speed.

The speed change mechanism operation control section 45 is a functional section that controls operation of the speed change mechanism 13. The speed change mechanism operation control section 45 determines a target shift speed, for example, by referencing a predetermined map (a speed change map), on the basis of the accelerator operation amount and the vehicle speed. The speed change mechanism operation control section 45 controls the hydraulic pressure to be supplied to a predetermined clutch, brake, or the like provided in the speed change mechanism 13 on the basis of the determined target shift speed to establish the target shift speed.

The first clutch C1 provided in the speed change mechanism 13 establishes a first speed through cooperation with a second brake also provided in the speed change mechanism 13, in the present example. A functional section that performs operation control for the first clutch C1 in the speed change mechanism operation control section 45 is specifically referred to as a first clutch operation control section 45a. The first clutch operation control section 45a performs the operation control for the first clutch C1 by controlling the hydraulic pressure to be supplied to the first clutch C1 via the hydraulic pressure control device 25 to control the engagement pressure of the first clutch C1. The operation control for the first clutch C1 performed by the first clutch operation control section 45a is basically the same as the operation control for the starting clutch CS performed by the starting clutch operation control section 44 except that the target to be controlled and some relevant matters are partly different.

The power generation starting control section 46 is a functional section that executes power generation starting control. The power generation starting control section 46 executes power generation starting control by cooperatively controlling the internal combustion engine control section 31, the rotary electric machine control section 43, the starting clutch operation control section 44, the first clutch operation control section 45a, and the like to make the vehicle 6 start moving while causing the rotary electric machine 12 to generate electric power. The content of the power generation starting control performed by the power generation starting control section 46 as a core section will be discussed in detail below.

3. Content of Power Generation Starting Control

The power generation starting control is started in the case where a starting operation performed by a driver is sensed, for example, in a state (in the present example, the stationary-state power generation mode is established) in which the rotary electric machine 12 generates electric power while the vehicle 6 is stationary. Here, the term "starting operation" refers to an operation performed by the driver of the vehicle 6 with an intention to start the vehicle. In the present example, an operation to depress the accelerator pedal 17 is defined as the "starting operation". Alternatively, an operation to release a brake pedal (not shown), an operation to put a gearshift into drive may be defined as the "starting operation".

The power generation starting control section 46, after sensed a starting operation, executes the power generation starting control during a period for which the vehicle 6 is at least in a predetermined specific low vehicle speed state. Here, the term "specific low vehicle speed state" refers to a state in which the rotational speed of the input shaft I (internal combustion engine 11) estimated in the case where it is assumed that both the starting clutch CS and the first clutch C1 are in the direct engagement state with the shift speed having the largest speed ratio (in the present example, the first speed) established in the speed change mechanism 13 is smaller than a specific low vehicle-speed determination threshold X1. It is necessary that the internal combustion engine 11, which is drivingly coupled to the input shaft I so as to rotate therewith, rotates at a certain speed or more in order to output predetermined internal combustion engine torque Te to continue self-sustained operation. It is also necessary that the internal combustion engine 11 should rotate at a certain speed or more from the viewpoint of suppressing occurrence of a muffled sound and vibration. Therefore, in the present example, the specific low vehicle-speed determination threshold X1 is set in consideration of such factors as well as with a predetermined margin.

In the present embodiment, the power generation starting control section 46 transits, in the power generation starting control executed in the specific low vehicle speed state, the travel mode of the vehicle 6 from the first slip power generation mode to the second slip power generation mode. The power generation starting control section 46 first causes the rotary electric machine 12 to generate electric power with both the starting clutch CS and the first clutch C1 in the slip engagement state, and thereafter, causes the rotary electric machine 12 to generate electric power with the starting clutch CS in the direct engagement state and the first clutch C1 in the slip engagement state. In the present embodiment, the power generation starting control corresponds to a "mode transition control" in the present invention.

Further, in the present embodiment, the power generation starting control section 46 continues executing the power generation starting control during a period for which the vehicle 6 is in a predetermined low vehicle speed state even after the vehicle 6 is out of the predetermined specific low vehicle speed state. Here, the term "low vehicle speed state" refers to a state in which the rotational speed of the input shaft I estimated in the case where it is assumed that both the starting clutch CS and the first clutch C1 are in the direct engagement state with the shift speed having the largest speed ratio established in the speed change mechanism 13 is smaller than a low vehicle-speed determination threshold X2 (not shown) that is set to a value greater than the specific low vehicle-speed determination threshold X1.

The power generation starting control section 46 transits, in the power generation starting control executed in the low vehicle speed state, the travel mode of the vehicle 6 from the second slip power generation mode to the parallel power generation mode. The power generation starting control section 46 causes the rotary electric machine 12 to generate electric power with the starting clutch CS in the direct engagement state and the first clutch C1 in the slip engagement state, and thereafter, when the vehicle becomes out of the specific low vehicle speed state along with an increase in vehicle speed but still continues in the low vehicle speed state, causes the rotary electric machine 12 to generate electric power with both the starting clutch CS and the first clutch C1 in the direct engagement state.

Figure 4:
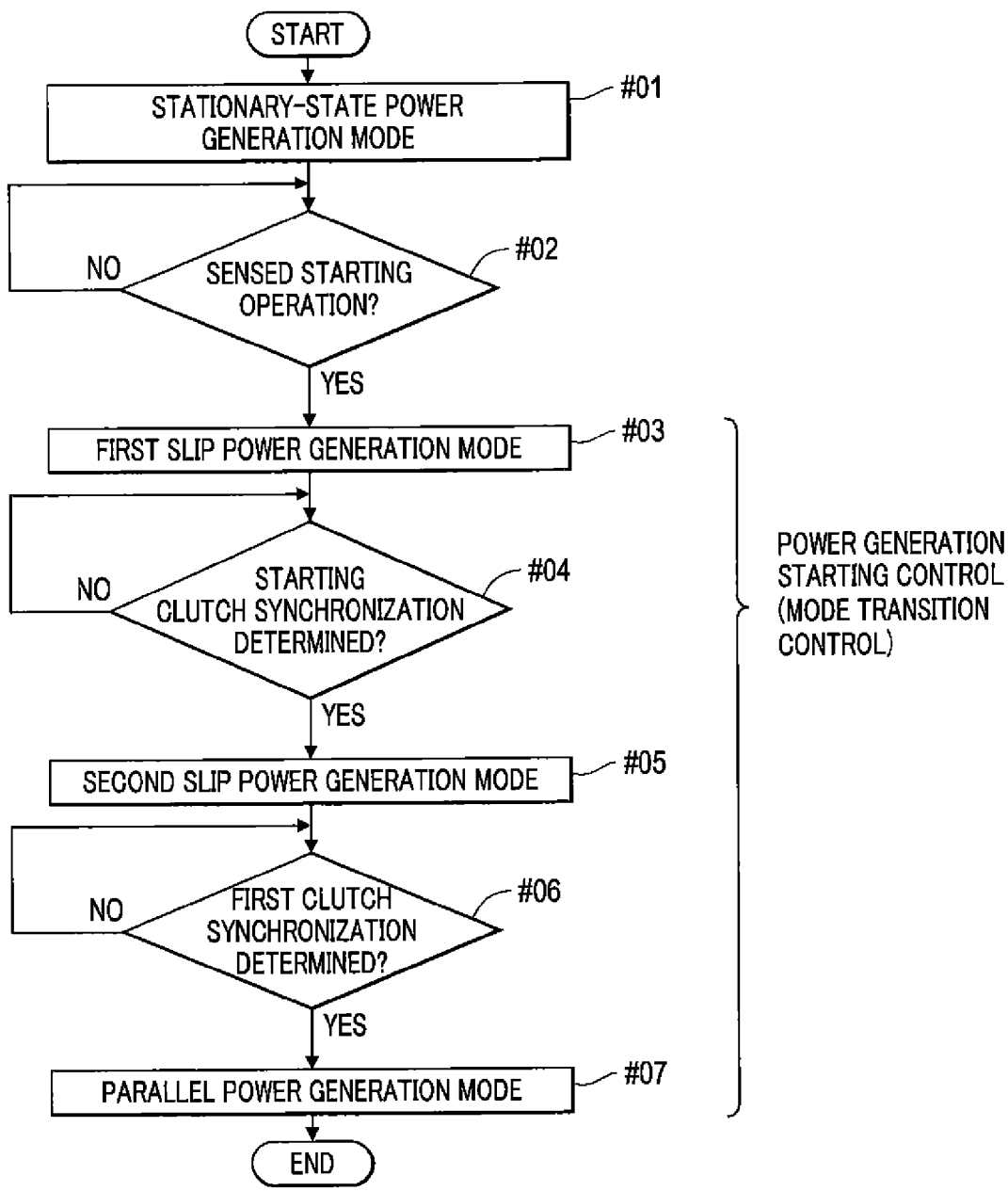
FIG. 4 is a flow chart showing processing procedures in the power generation starting control.

The content of the power generation starting control is further described in detail with reference to FIGS. 3 and 4. In the following description, the respective function sections perform respective processes based on a command from the power generation starting control section 46. In addition, it is assumed that the first speed is established in the speed change mechanism 13.

In the present example, the stationary-state power generation mode is established in an initial state, and the rotary electric machine 12 generate electric power with the internal combustion engine torque Te (before time T01, step #01). In the stationary-state power generation mode, the starting clutch CS is brought into the direct engagement state, and the first clutch C1 is brought into the disengaged state. In addition, the torque control for the internal combustion engine 11 and the torque control for the rotary electric machine 12 are executed. More specifically, the internal combustion engine control section 31 performs the torque control for the internal combustion engine 11 by using torque required for the rotary electric machine 12 to generate a predetermined target power generation amount as the target torque. The rotary electric machine control section 43 performs the torque control for the rotary electric machine 12 by using negative torque with the largeness (an absolute value) equal to the internal combustion engine torque Te as the target torque. Here, the pre-determined target power generation amount is determined on the basis of rated consumed electric power, actual consumed electric power, and the like of auxiliary machines that are provided in the vehicle 6 and that are driven with electric power (for example, a compressor of an in-vehicle air conditioner, lamps, and the like), and as appropriate, on the basis of the amount of electric power stored in the electricity storage device 28 and the like.

When a starting operation (in the present example, depressing the accelerator pedal) is sensed at time T01 in the stationary-state power generation mode (step #02: Yes), the mode transition is performed from the stationary-state power generation mode to the first slip power generation mode (step #03). In the event of the mode transition, the starting clutch operation control section 44 gradually decreases the hydraulic pressure to be supplied to the starting clutch CS to the slip engagement pressure, and the first clutch operation control section 45*a* increases the hydraulic pressure to be supplied to the first clutch C1 to the slip engagement pressure (time T01 to T02). In addition, the rotary electric machine control section 43 performs rotational speed control for the rotary electric machine 12 based on a predetermined target rotational speed Nmt. Here, the target rotational speed Nmt is set to a value greater than the rotational speed (in the present embodiment, referred to as "converted rotational speed Noc") of the intermediate shaft M in accordance with the rotational speed of the output shaft O in the case where it is assumed that the first speed is established in the speed change mechanism 13 (in such case, at least the first clutch C1 is in the direct engagement state), and equal to or smaller than the rotational speed of the internal combustion engine 11. The converted rotational speed Noc is a hypothetical rotational speed (described with "synchronous line" in FIG. 3) obtained by converting the rotational speed No of the output shaft O to a rotational speed to be transferred to the rotary electric machine 12 in the case where it is assume that the first speed is established. More specifically, the converted rotational speed Noc is a hypothetical rotational speed obtained by multiplying the rotational speed No of the output shaft O by the speed ratio of the first speed. This makes it possible to bring the starting clutch CS and the first clutch C1 into the slip engagement state immediately after the mode transition to the first slip power generation mode.

In the first slip power generation mode established in time T01 to T04, the first clutch operation control section 45*a* controls the transfer torque of the first clutch C1 in the slip engagement state such that torque according to the required drive force Td required to drive the wheels 15 is transferred. That is, the first clutch operation control section 45*a* performs torque control for the first clutch C1 by using, as the target transfer torque capacity, torque according to the position of the first clutch C1 on a power transfer patch that connects the intermediate shaft M to the output shaft O such that the required drive force Td is transferred to the wheels 15.

The rotary electric machine control section 43 performs rotational speed control for the rotary electric machine 12 based on the target rotational speed Nmt. In the present embodiment, the target rotational speed setting section 43*a* sets the rotational speed obtained by adding a first differential rotational speed ΔN1 that is previously determined to the converted rotational speed Noc as the target rotational speed Nmt. The first differential rotational speed ΔN1 is set based on the target power generation amount. That is, the first differential rotational speed ΔN1 is set to a rotational speed that enables to ensure the target power generation amount within the range of torque that can be output from the rotary electric machine 12. Setting such first differential rotational speed ΔN1 makes it possible to maintain the actual rotational speed of the rotary electric machine 12 significantly greater than the converted rotational speed Noc regardless of instantaneous changes in the rotational speed of the output shaft O. Thereby, the first clutch C1 can be surely brought into the slip engagement state while the target power generation amount is ensured. In the present example, as shown in FIG. 3, the target rotational speed Nmt gradually increases along with an increase in vehicle speed (or, an increase in the rotational speed of the output shaft O).

The internal combustion engine control section 31 performs torque control for the internal combustion engine 11 by using, as the target torque, torque obtained by adding torque according to the required drive force Td to torque to cause the rotary electric machine 12 to generate electric power. Here, the torque according to the required drive force Td is obtained by dividing the required drive force Td by the speed ratio of the first speed. The torque to cause the rotary electric machine 12 to generate electric power is obtained by dividing the target power generation amount by the target rotational speed Nmt.

The starting clutch operation control section 44 performs rotational speed control for the starting clutch CS by using a predetermined rotational speed (for example, a minimum rotational speed necessary for the internal combustion engine 11 to continue self-sustained operation) smaller than the specific low vehicle-speed determination threshold X1 as the target rotational speed of the internal combustion engine 11. This allows at least the internal combustion engine 11 to continue self-sustained operation while the internal combustion engine torque Te that is output as a result of the torque control of the internal combustion engine 11 is transferred as it is to the side of the rotary electric machine 12.

In the first slip power generation mode, both the starting clutch CS and the first clutch C1 are brought into the slip engagement state. This makes it possible to decrease the differential rotational speed (hereinafter, simply referred to as "differential rotational speed of the first clutch C1") between the engagement members on both sides of the first clutch C1 in a state in which the vehicle 6 travels in the specific low vehicle speed state while the internal combustion engine 11 is driven at the rotational speed at which the internal combustion engine 11 can continue self-sustained operation, as in the present embodiment. Especially, the differential rotational speed of the first clutch C1 can be decreased compared to a case where the starting clutch CS is brought into the direct engagement state and the first clutch C1 is only brought into the slip engagement state. Thereby, the amount of heat generation of the first clutch C1 can be suppressed. In addition, the rotational speed of the rotary electric machine 12 can be maintained greater than the converted rotational speed Noc by bringing the first clutch C1 into the slip engagement state. Thus, the target power generation amount can be ensured by causing the rotary electric machine 12 rotating such rotational speed to generate electric power.

In the first slip power generation mode, a synchronization determination for the starting clutch CS is performed while the rotational speed of the rotary electric machine 12 gradually increases following an increase in the target rotational speed Nmt accompanied by an increase in vehicle speed (step #04). The power generation starting control section 46 performs the synchronization determination for the starting clutch CS by determining whether the differential rotational speed (hereinafter, simply referred to as "differential rotational speed of the starting clutch CS") between the engagement members on both sides of the starting clutch CS, that is, the differential rotational speed between the internal combustion engine 11 and the rotary electric machine 12 in the present example is equal to or smaller than a first synchronization determination threshold Z1. Thereafter, when the differential rotational speed of the starting clutch CS becomes equal to or smaller than the first synchronization determination threshold Z1 at time T03 in the course of time (step #04: Yes), the mode transition from the first slip power generation mode to the second slip power generation mode is performed (step #05).

In the event of the mode transition, the starting clutch operation control section 44 gradually increases the hydraulic pressure to be supplied to the starting clutch CS at a constant rate of change with time from time T03, and increases the hydraulic pressure to the complete engagement pressure in a stepped manner at time T04, at which a predetermined time has elapsed, to bring the starting clutch CS into the direct engagement state.

In the second slip power generation mode established from time T04 to T06, the first clutch operation control section 45a performs torque control for the first clutch C1 in the same manner as the first slip power generation mode. In addition, the internal combustion engine control section 31 performs torque control for the internal combustion engine 11 in the same manner as the first slip power generation mode. The target rotational speed setting section 43a sets the target rotational speed Nmt such that the target rotational speed Nmt increases at a constant rate of change with time smaller than a rate of change with time of the converted rotational speed Noc. Thereby, as shown in FIG. 3, the differential rotational speed between the rotational speed of the internal combustion engine 11 and the rotary electric machine 12 that rotate together with each other and the converted rotational speed Noc gradually decreases with time.

In the second slip power generation mode, following the first slip power generation mode, the first clutch C1 is brought into the slip engagement state. This enables to maintain the rotational speed of the rotary electric machine 12 greater than the converted rotational speed Noc and ensure the target power generation amount. In this event, the starting clutch CS is brought into the direct engagement state instead of the slip engagement state. This enables to transfer the internal combustion engine torque Te as it is to the side of the rotary electric machine 12. Thus, it is possible to reduce energy loss in the event of torque transfer via the starting clutch CS and improve the power generation efficiency of the rotary electric machine 12. In addition, the differential rotational speed of the starting clutch CS whose transfer torque is relatively large by torque to cause the rotary electric machine 12 to generate electric power is brought to zero, which makes it possible to suppress the heat generation. Thus, it is possible to reduce the overall amount of heat generation of both the clutches CS and C1 compared to the first slip power generation mode in which both the starting clutch CS and the first clutch C1 are brought into the slip engagement state.

In the mode transition from the first slip power generation mode to the second slip power generation mode, the starting clutch CS is transitioned from the slip engagement state to the direct engagement state, as described above. The state transition of the starting clutch CS is performed with the first clutch C1 in the slip engagement state. This makes it possible to suppress the engagement shock (direct engagement transition shock) to be transferred to the vehicle 6 in the state transition.

In the second slip power generation mode, the synchronization determination for the first clutch C1 is performed in a state in which the differential rotational speed between the rotational speed of the internal combustion engine 11 and the rotary electric machine 12 and the converted rotational speed Noc is decreased (step #06). The power generation starting control section 46 performs the synchronization determination for the first clutch C1 by determining whether the differential rotational speed between the rotational speed of the internal combustion engine 11 and the rotary electric machine 12 and the converted rotational speed Noc is equal to or smaller than a second synchronization determination threshold Z2. Thereafter, when the differential rotational speed becomes equal to or smaller than the second synchronization determination threshold Z2 at time T05 in the course of time (step #06: Yes), the mode transition from the second slip power generation mode to the parallel power generation mode is performed (step #07).

In the event of the mode transition, the first clutch operation control section 45a gradually increases the hydraulic pressure to be supplied to the first clutch C1 at a constant rate of change with time from time T05, and increases the hydraulic pressure to the complete engagement pressure in a stepped manner at time T06, at which a predetermined time has elapsed, to bring the first clutch C1 into the direct engagement state.

In the parallel power generation mode established after time T06, the internal combustion engine control section 31 performs torque control for the internal combustion engine 11 in the same manner as the first slip power generation mode and the second slip power generation mode. The rotary electric machine control section 43 performs torque control for the rotary electric machine 12 in the same manner as the stationary-state power generation mode. In the parallel power generation mode, following the second slip power generation mode, the starting clutch CS is brought into the direct engagement state. Thus, it is possible to improve the power generation efficiency of the rotary electric machine 12. In addition, both the starting clutch CS and the first clutch C1 are brought into the direct engagement state. Thus, the differential rotational speed of the starting clutch CS and the first clutch C1 is brought to zero, which make it possible to suppress the heat generation.

In the present embodiment as described above, the power generation starting control section 46 executes power generation starting control to establish the first slip power generation mode, the second slip power generation mode, and the parallel power generation mode in this order in a state in which the vehicle 6 is being accelerated. That is, the power generation starting control section 46 performs the mode transition from the first slip power generation mode to the second slip power generation mode along with an increase in vehicle speed, and thereafter, performs the mode transition from the second slip power generation mode to the parallel power generation mode along with a further increase in vehicle speed. This makes it possible, as described above, to ensure the target power generation amount, and also establish a desirable traveling state regarding the overall amount of heat generation of both the clutches CS and C1 and the power generation efficiency of the rotary electric machine 12, or reducing shock to be transferred to the vehicle 6, and the like, according to the situation.

4. Other Embodiments

Lastly, control devices according to other embodiments of the present invention will be described. A configuration disclosed in each of the following embodiments may be applied in combination with a configuration disclosed in any other embodiment unless any contradiction occurs.

Figure 5:
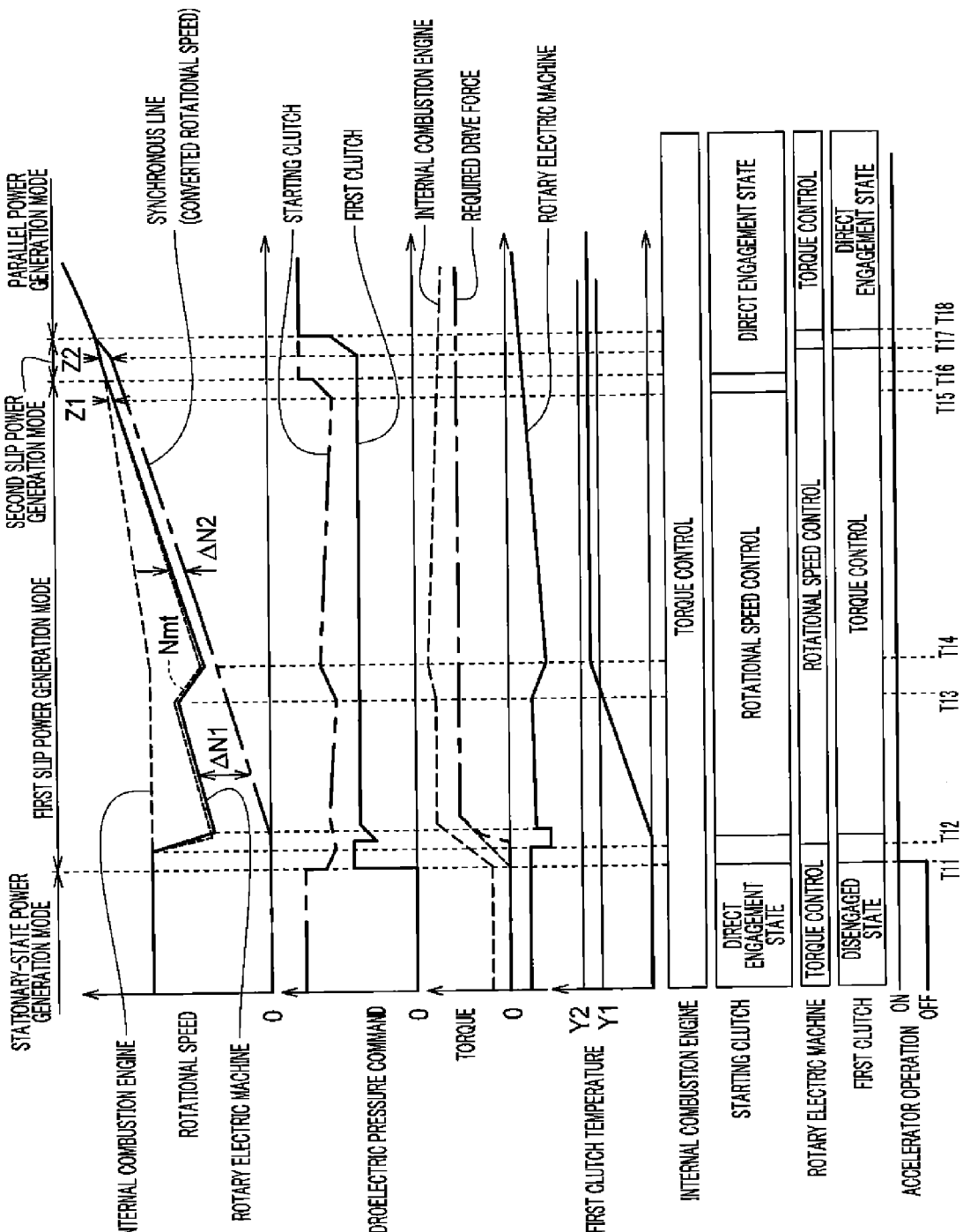
FIG. 5 is a timing chart showing another example of the operating state of each part at the time power generation starting control is performed.
Figure 6:
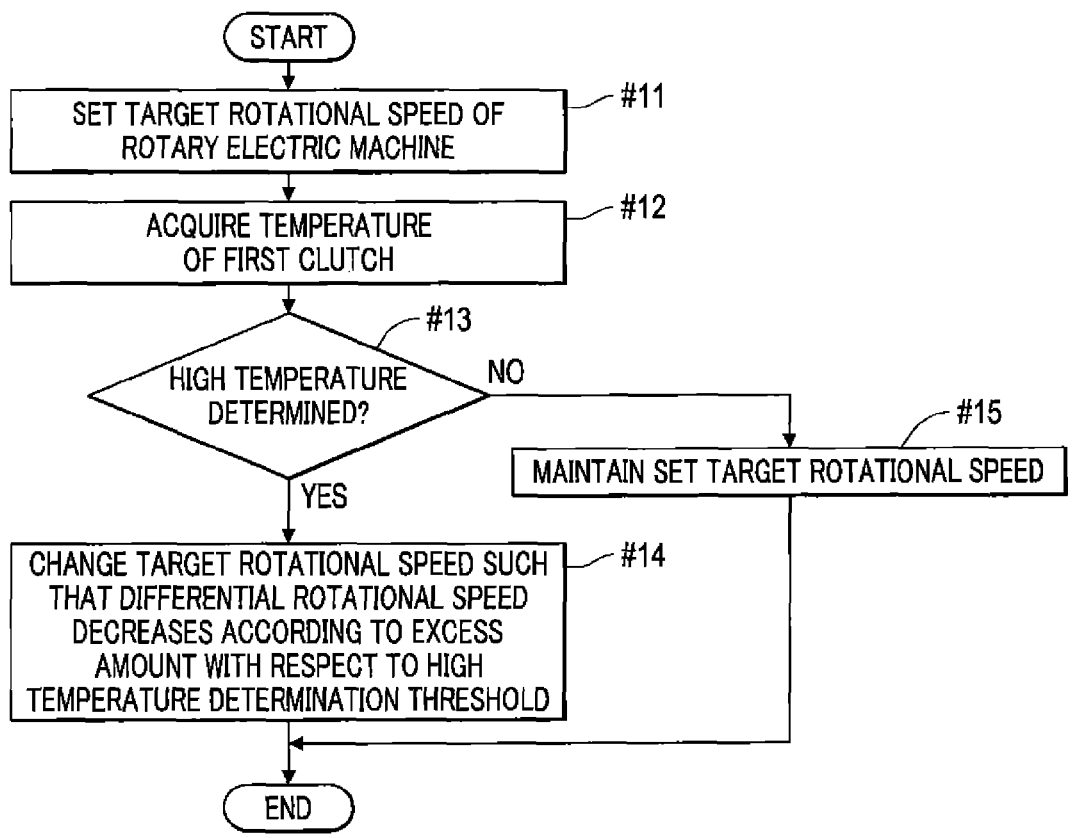
FIG. 6 is a flow chart showing processing procedures in overheat avoidance control.

(1) In the present embodiment described above, in the first slip power generation mode, it is preferable that the rotational speed of the rotary electric machine 12 is configured to be controlled also based on the temperature of the first clutch C1 (refer to FIGS. 5 and 6). For example, with the rotational speed control of the rotary electric machine 12 being performed based on the target rotational speed Nmt that was set as described in the above embodiment (step #11), when it has been sensed that the temperature of the first clutch C1 has approached an upper limit temperature Y2, the rotational speed of the rotary electric machine 12 may be controlled such that the differential rotational speed of the first clutch C1 decreases. In such case, for example, as shown with a block enclosed by a dashed line in FIG. 1, the control device 4 is configured to include a temperature state monitor section 51 that monitors the temperature of the first clutch C1. The temperature state monitor section 51 may be configured to directly obtain the temperature of the first clutch C1, for example, based on the information from a clutch temperature sensor that detects the temperature of the first clutch C1. Or, the temperature state monitor section 51 may be configured to calculate the amount of heat generation of the first clutch C1 based on the transfer torque capacity and the differential rotational speed of the first clutch C1 and obtain an estimated temperature of the first clutch C1 based on the amount of heat generation. The temperature of the first clutch C1 may be obtained based on other known methods (step #12).

While the temperature of the first clutch C1 obtained by the temperature state monitor section 51 is lower than a high temperature determination threshold Y1 that is previously determined (time T12 to T13, step #13: No), the target rotational speed setting section 43a maintains the target rotational speed Nmt that is set at the time point (step #15). On the other hand, when the temperature of the first clutch C1 becomes equal to or higher than the high temperature determination threshold Y1 (after time T13, step #13: Yes), the target rotational speed setting section 43a changes (lowers) the target rotational speed Nmt such that the differential rotational speed between the rotational speed of the rotary electric machine 12 and the converted rotational speed Noc decreases. In this event, the target rotational speed setting section 43a makes the target rotational speed Nmt smaller such that the aforementioned differential rotational speed decreases as the temperature of the first clutch C1 increases after exceeding the high temperature determination threshold Y1 (step #14). However, the target rotational speed Nmt is set equal to or greater than a rotational speed obtained by adding a second differential rotational speed $\Delta N2$ that is set to a value smaller than the first differential rotational speed $\Delta N1$ to the converted rotational speed Noc (time T14 to T16). The second differential rotational speed $\Delta N2$ is set to a value that makes it possible to steadily maintain the actual rotational speed of the rotary electric machine 12 significantly greater than the converted rotational speed Noc regardless of instantaneous changes in the rotational speed of the output shaft O. The above process is repeatedly executed in a successive manner while the power generation starting control is being executed. Such process is referred to as overheat avoidance control.

According to the overheat avoidance control, it can be sensed based on the magnitude relation between the temperature of the first clutch C1 and the high temperature determination threshold Y1 that the first clutch is about to be overheated. When such situation is sensed, the amount of heat generation of the first clutch C1 can be reduced by decreasing the differential rotational speed of the first clutch C1. In this event, the amount of heat generation of the first clutch C1 can be more efficiently reduced as the excess amount of the temperature of the first clutch C1 with respect to the high temperature determination threshold Y1 increases, which makes it possible to efficiently suppress the overheating of the first clutch C1. In the example shown in FIG. 5, with the execution of the overheat avoidance control, the temperature of the first clutch C1 converges to a predetermined temperature that is lower than the upper limit temperature Y2 in the course of time. In addition, when the excess amount of the temperature of the first clutch C1 with respect to the high temperature determination threshold Y1 is relatively small, for example, when the temperature of the first clutch C1 is decreased thereafter, the amount of decrease in the differential rotational speed of the first clutch C1 can be reduced. Thereafter, the differential rotational speed of the first clutch C1 is increased to the extent that overheating of the first clutch C1 does not become especially crucial and the differential rotational speed of the starting clutch CS is decreased, which makes it possible to reduce the overall amount of heat generation of both the clutches CS and C1.

The target rotational speed setting section 43a may be configured to decrease the differential rotational speed between the rotational speed of the rotary electric machine 12 and the converted rotational speed Noc by a predetermined amount regardless of the excess amount of the temperature of the first clutch C1 with respect to the high temperature determination threshold Y1.

In addition, the temperature of the first clutch C1 can be estimated based on the amount of heat generation of the first clutch C1, as described above. In the overheat avoidance control, for example, the temperature state monitor section 51 is configured to monitor the amount of heat generation of the first clutch C1 instead of the temperature of the first clutch C1, and when the amount of heat generation becomes equal to or greater than a predetermined high heat generation determination threshold, the same process as above may be performed. This procedure is substantially the same as the aforementioned procedure. Therefore, the same effects as the aforementioned procedure can be produced.

Figure 7:
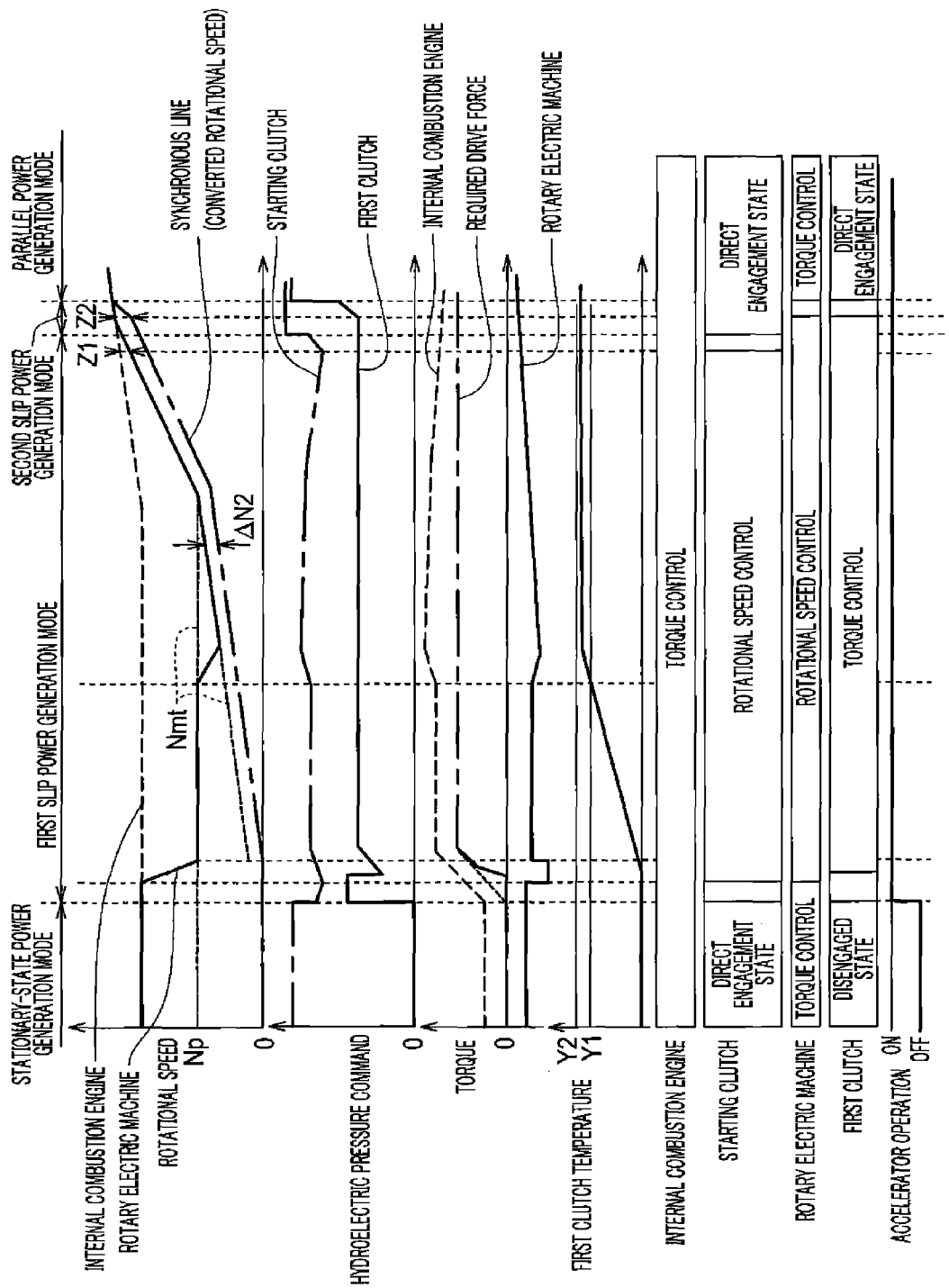
FIG. 7 is a timing chart showing still another example of the operating state of each part at the time power generation starting control is performed.

(2) In the embodiment described above, in the first slip power generation mode, the target rotational speed setting section 43a sets the rotational speed that is obtained by adding the first differential rotational speed $\Delta N1$ to the converted rotational speed Noc as the target rotational speed Nmt. However, embodiments of the present invention are not limited thereto. That is, for example, the target rotational speed setting section 43a may be configured to set the target rotational speed Nmt based on a set rotational speed Np that is previously set, the converted rotational speed Noc, and the second differential rotational speed $\Delta N2$ that is previously set. An example in such case is shown in FIG. 7. More specifically, the target rotational speed setting section 43a sets the set rotational speed Np or the rotational speed that is obtained by adding the second differential rotational speed $\Delta N2$ to the converted rotational speed Noc, whichever is greater, as the target rotational speed Nmt. Based on the target rotational speed Nmt set in such manner, the rotary electric machine control section 43 performs rotational speed control for the rotary electric machine 12 by using the set rotational speed Np as a first target, and after the differential rotational speed between the set rotational speed Np and the converted rotational speed Noc becomes equal to or smaller than the second differential rotational speed $\Delta N2$, performs the rotational speed control for the rotary electric machine 12 by using the rotational speed obtained by adding the second differential rotational speed $\Delta N2$ to the converted rotational speed Noc as a second target. In the example shown in FIG. 7, the aforementioned overheat avoidance control is executed at the same time. Before the differential rotational speed between the set rotational speed Np and the converted rotational speed Noc becomes equal to or smaller than the second differential rotational speed $\Delta N2$, the differential rotational speed between the rotational speed of the rotary electric machine 12 and the converted rotational speed Noc is forcibly decreased to the second differential rotational speed $\Delta N2$. In the present example, the same value as described in Other Embodiments (1) is applied for the second differential rotational speed $\Delta N2$. However, a different value may be applied for the second differential rotational speed $\Delta N2$.

In the present example, the set rotational speed Np is set based on the target power generation amount, which is described in the above embodiment. That is, the set rotational speed Np is set as a rotational speed that makes it possible to ensure the target power generation amount within the range of torque that can be output from the rotary electric machine 12. The set rotational speed Np may be set in consideration of the rational speed that allows an oil pump that is drivingly coupled to the intermediate shaft so as to rotate therewith to ensure the hydraulic pressure that is necessary for all engagement devices including the starting clutch CS and the first clutch C1. In addition, the set rotational speed Np may be set according to other targets. In such configuration, the rotational speed of the rotary electric machine 12 can be maintained equal to or greater than the set rotational speed Np. Thus, the rotational speed of the rotary electric machine 12 can be maintained equal to or greater than the necessary rotational speed by appropriately setting the set rotational speed Np according to various kinds of targets.

The target rotational speed setting section 43a may be configured to set the target rotational speed Nmt based on a method different from the method described in the aforementioned embodiment and the method described herein. In short, any configuration can be adapted as a setting method of the target rotational speed Nmt in the rotational speed control of the rotary electric machine 12.

(3) In the embodiment described above, the power generation starting control is executed when the vehicle 6 starts moving from a stationary state in the stationary-state power generation mode. However, embodiments of the present invention are not limited thereto. That is, the power generation starting control may be executed, for example, when the vehicle 6 starts moving from a state in which the vehicle is stationary without the rotary electric machine generating electric power or from a stationary state in the slip travel mode. Alternatively, in these cases, the power generation starting control may be executed only in a predetermined low-amount stored electric power state (for example, a state in which the amount of electric power stored in the electricity storage device 28 is equal to or lower than a low-amount stored electric power determination threshold that is previously determined).

In addition, the mode transition to the first slip power generation mode, and thereafter the second slip power generation mode (and to the parallel power generation mode, if necessary) may be performed from a state other than when the vehicle 6 start moving, for example, from a state in which the vehicle 6 is traveling at an extremely-low speed. In such case, a series of the necessary processes corresponds to the "mode transition control" in the present embodiment.

(4) In the embodiment described above, one (the first clutch C1) of the engagement devices for shifting provided in the speed change mechanism 13 is used as the "second engagement device." However, embodiments of the present invention are not limited thereto. That is, another engagement device provided in the speed change mechanism 13 may be used as the "second engagement device," provided that the engagement device is arranged on the side of the output shaft O with respect to the rotary electric machine 12 on the power transfer path that connects the input shaft I to the output shaft O.

In addition, for example, in the case where a hydraulic clutch such as a torque convertor is provided between the rotary electric machine 12 and the output shaft O, a lock-up clutch included in the hydraulic clutch can be used as the "second engagement device." Alternatively, for example, when a dedicated transfer clutch is provided between the rotary electric machine 12 and the output shaft O, the transfer clutch can be used as the "second engagement device." In these cases, an automatic continuously variable transmission, a stepped manual transmission, and a transmission with a fixed speed ratio, etc. may be used as the speed change mechanism 13. In addition, the position of the speed change mechanism 13 can be set as desired.

(5) In the embodiment described above, the starting clutch CS and the first clutch C1 are each a hydraulically driven engagement device, the engagement pressure of which is controlled in accordance with a supplied hydraulic pressure. However, embodiments of the present invention are not limited thereto. That is, the starting clutch CS and the first clutch C1 may each be any engagement device, the transfer torque capacity (transfer torque) of which can be regulated in accordance with an increase and a decrease in engagement pressure. For example, one or both of the starting clutch CS and the first clutch C1 are each an electromagnetic engagement device, the engagement pressure of which is controlled in accordance with an electromagnetic force.

(6) In the present embodiment described above, the internal combustion engine control unit 30 that mainly controls the internal combustion engine 11 and the drive device control unit 40 (control device 4) that mainly controls the rotary electric machine 12, the starting clutch CS, and the speed change mechanism 13 are provided individually. However, embodiments of the present invention are not limited thereto. That is, the single control device 4 may be configured to control all of the internal combustion engine 11, the rotary electric machine 12, the starting clutch CS, the speed change mechanism 13, etc, for example. Alternatively, the control device 4 may be configured to further individually include a control unit that controls the rotary electric machine 12 and a control unit that controls various other components. The allotment of the functional sections described in relation to the embodiment described above is merely illustrative, and a plurality of functional sections may be combined with each other, or a single functional section may be further divided into sub-sections.

(7) Also regarding other configurations, the embodiment disclosed herein is illustrative in all respects, and the present invention is not limited thereto. That is, a configuration not described in the claims of the present invention may be altered without departing from the object of the present invention.

INDUSTRIAL APPLICABILITY

The present invention may be applied to a control device that controls a vehicle drive device in which an internal combustion engine and a rotary electric machine are provided.

DESCRIPTION OF THE REFERENCE NUMERALS

1 DRIVE DEVICE (VEHICLE DRIVE DEVICE)
4 CONTROL DEVICE
11 INTERNAL COMBUSTION ENGINE
12 ROTARY ELECTRIC MACHINE
15 WHEEL
43 ROTARY ELECTRIC MACHINE CONTROL SECTION
43a TARGET ROTATIONAL SPEED SETTING SECTION
44 STARTING CLUTCH OPERATION CONTROL SECTION
45a FIRST CLUTCH OPERATION CONTROL SECTION
46 POWER GENERATION STARTING CONTROL SECTION
51 TEMPERATURE STATE MONITOR SECTION
I INPUT SHAFT
O OUTPUT SHAFT (OUTPUT MEMBER)
CS STARTING CLUTCH (FIRST ENGAGEMENT DEVICE)
C1 FIRST CLUTCH (SECOND ENGAGEMENT DEVICE)
Td REQUIRED DRIVE FORCE
Nmt TARGET ROTATIONAL SPEED
$\Delta N1$ FIRST DIFFERENTIAL ROTATIONAL SPEED
$\Delta N2$ SECOND DIFFERENTIAL ROTATIONAL SPEED
Np SET ROTATIONAL SPEED
Y1 HIGH TEMPERATURE DETERMINATION THRESHOLD

The invention claimed is:

1. A control device that controls a vehicle drive device in which a first engagement device, a rotary electric machine, a second engagement device, and an output member are sequentially arranged in this order from an internal combustion engine side on a power transfer path that connects the internal combustion engine to wheels, wherein
the control device executes mode transition control in which a first control mode where the rotary electric machine generates electric power with both the first engagement device and the second engagement device in a slip engagement state is transitioned to a second control mode where the rotary electric machine generates electric power with the first engagement device in a direct engagement state and the second engagement device in the slip engagement state,
and wherein, in the first control mode,
the control device:
controls transfer torque of the second engagement device in the slip engagement state such that torque according to a required drive force to drive the wheels is transferred; and
controls a rotational speed of the rotary electric machine so as to achieve a set rotational speed that is previously set, and when a differential rotational speed between the set rotational speed and a converted rotational speed that is obtained by converting a rotational speed of the output member to a rotational speed to be transferred to the rotary electric machine in a case in which the second engagement device is in the direct engagement state becomes equal to or smaller than a second differential rotational speed, controls the rotational speed of the rotary electric machine so as to achieve a rotational speed that is obtained by adding the second differential rotational speed to the converted rotational speed.

2. The control device according to claim 1, wherein, in the first control mode,
the control device:
controls transfer torque of the second engagement device in the slip engagement state such that torque according to a required drive force to drive the wheels is transferred; and
controls a rotational speed of the rotary electric machine so as to achieve a rotational speed that is obtained by adding a first differential rotational speed to a converted rotational speed that is obtained by converting a rotational speed of the output member to a rotational speed to be transferred to the rotary electric machine in the case in which the second engagement device is in the direct engagement state.

3. The control device according to claim 1, wherein, in the first control mode,
when a temperature of the second engagement device becomes equal to or higher than a high temperature determination threshold that is previously determined, the control device controls a rotational speed of the rotary electric machine such that a differential rotational speed between a converted rotational speed that is obtained by converting a rotational speed of the output member to a rotational speed to be transferred to the rotary electric machine in the case in which the second engagement device is in the direct engagement state and the rotational speed of the rotary electric machine is decreased.

4. The control device according to claim 3, wherein the differential rotational speed is decreased as the temperature of the second engagement device increases after exceeding the high temperature determination threshold.

5. The control device according to claim 1, wherein, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

6. The control device according to claim 2, wherein, in the first control mode,
when a temperature of the second engagement device becomes equal to or higher than a high temperature determination threshold that is previously determined, the control device controls a rotational speed of the rotary electric machine such that a differential rotational speed between a converted rotational speed that is obtained by converting a rotational speed of the output member to a rotational speed to be transferred to the rotary electric machine in the case in which the second engagement device is in the direct engagement state and the rotational speed of the rotary electric machine is decreased.

7. The control device according to claim 6, wherein the differential rotational speed is decreased as the temperature of the second engagement device increases after exceeding the high temperature determination threshold.

8. The control device according to claim 2, wherein, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

9. The control device according to claim 3, wherein, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

10. The control device according to claim 6, wherein, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

11. The control device according to claim 4, wherein, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

12. The control device according to claim 7, wherein, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

13. The control device according to claim 1, wherein, in the mode transition control, along with an increase in a rotational speed of the output member, the first control mode is transitioned to the second control mode; and thereafter, along with a further increase in the rotational speed of the output member, the second control mode is transitioned to a third control mode in which the rotary electric machine generates electric power with both the first engagement device and the second engagement device in the direct engagement state.

* * * * *